United States Patent
Willard

(10) Patent No.: US 6,789,836 B2
(45) Date of Patent: Sep. 14, 2004

(54) CONVERTIBLE BACKLITE CONTROL SYSTEM

(75) Inventor: Michael T. Willard, Harrison Township, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/619,229

(22) Filed: Jul. 14, 2003

(65) Prior Publication Data

US 2004/0046413 A1 Mar. 11, 2004

Related U.S. Application Data

(60) Provisional application No. 60/409,321, filed on Sep. 10, 2002.

(51) Int. Cl.$^7$ .................................................. B60J 7/12
(52) U.S. Cl. ................................................. 296/107.07
(58) Field of Search ..................... 296/107.01, 107.04, 296/107.07, 107.09, 107.15, 109, 225

(56) References Cited

U.S. PATENT DOCUMENTS

| | | |
|---|---|---|
| 1,440,344 A | 12/1922 | Donnelly |
| 1,456,724 A | 5/1923 | Donnelly |
| 1,963,941 A | 6/1934 | Duffy |
| 2,798,763 A | 7/1957 | Dujic |
| 3,188,135 A | 6/1965 | Bernstein et al. |
| 3,385,629 A | 5/1968 | Podolan |
| 3,709,553 A | 1/1973 | Churchill et al. |
| 4,572,570 A | 2/1986 | Trucco |
| 4,778,215 A | 10/1988 | Ramaciotti |
| 4,799,727 A | 1/1989 | Robbins et al. |
| 5,015,028 A | 5/1991 | Bonnett |
| 5,050,663 A | 9/1991 | Rhoads et al. |
| RE34,033 E | 8/1992 | Godette |
| 5,195,798 A | 3/1993 | Klein et al. |
| 5,375,901 A | 12/1994 | Agosta et al. |
| 5,451,090 A | 9/1995 | Brodie et al. |
| 5,540,476 A | 7/1996 | Cowsert |
| 5,558,390 A | 9/1996 | Hemmis et al. |

(List continued on next page.)

FOREIGN PATENT DOCUMENTS

| | | | | |
|---|---|---|---|---|
| JP | 62-026119 A | * | 2/1987 | ............ 296/107.09 |
| JP | 02-106433 A | * | 4/1990 | ............ 296/107.06 |
| JP | 05-193363 A | * | 8/1993 | ............ 296/107.09 |

OTHER PUBLICATIONS

RTP Co. "Living Hinge" internet publication, http://www.asiateck.com.tw/info/molding/design/hinge.htm (published Mar. 29, 2002).

*Primary Examiner*—D. Glenn Dayoan
*Assistant Examiner*—Paul Chenevert
(74) *Attorney, Agent, or Firm*—Harness, Dickey & Pierce, P.L.C.

(57) ABSTRACT

A backlite control system is provided for an automotive vehicle having a convertible roof. In another aspect of the present invention, a backlite control link uses a living hinge to aid in controlling the travel of the backlite during expansion and retraction of the convertible roof. A further aspect of the present invention employs a backlite control link directly connected to the number four roof bow of the convertible roof assembly.

32 Claims, 7 Drawing Sheets

U.S. PATENT DOCUMENTS

| | | |
|---|---|---|
| 5,704,173 A | 1/1998 | Repp et al. |
| 5,788,316 A | 8/1998 | Rothe |
| 5,807,515 A | 9/1998 | Fisher et al. |
| 5,822,932 A | 10/1998 | Agrawal |
| 5,829,820 A | 11/1998 | Cowsert |
| 5,887,936 A | 3/1999 | Cowsert |
| 5,903,119 A | 5/1999 | Laurain et al. |
| 5,998,948 A | 12/1999 | Lange et al. |
| 6,062,630 A | 5/2000 | Taylor |
| 6,082,807 A | 7/2000 | Hartmann et al. |
| 6,123,383 A | 9/2000 | Doerflinger et al. |
| 6,260,904 B1 | 7/2001 | Hartmann et al. |
| 6,283,532 B1 | 9/2001 | Neubrand |
| 6,302,470 B1 | 10/2001 | Maass et al. |
| 6,302,471 B1 | 10/2001 | Windpassinger et al. |
| 6,322,130 B1 | 11/2001 | Wanden et al. |
| 6,340,196 B1 | 1/2002 | Windpassinger et al. |
| 6,340,197 B1 | 1/2002 | Windpassinger |
| 6,341,810 B2 | 1/2002 | Hartmann et al. |
| 2004/0046413 A1 * | 3/2004 | Willard ................. 296/107.07 |

* cited by examiner

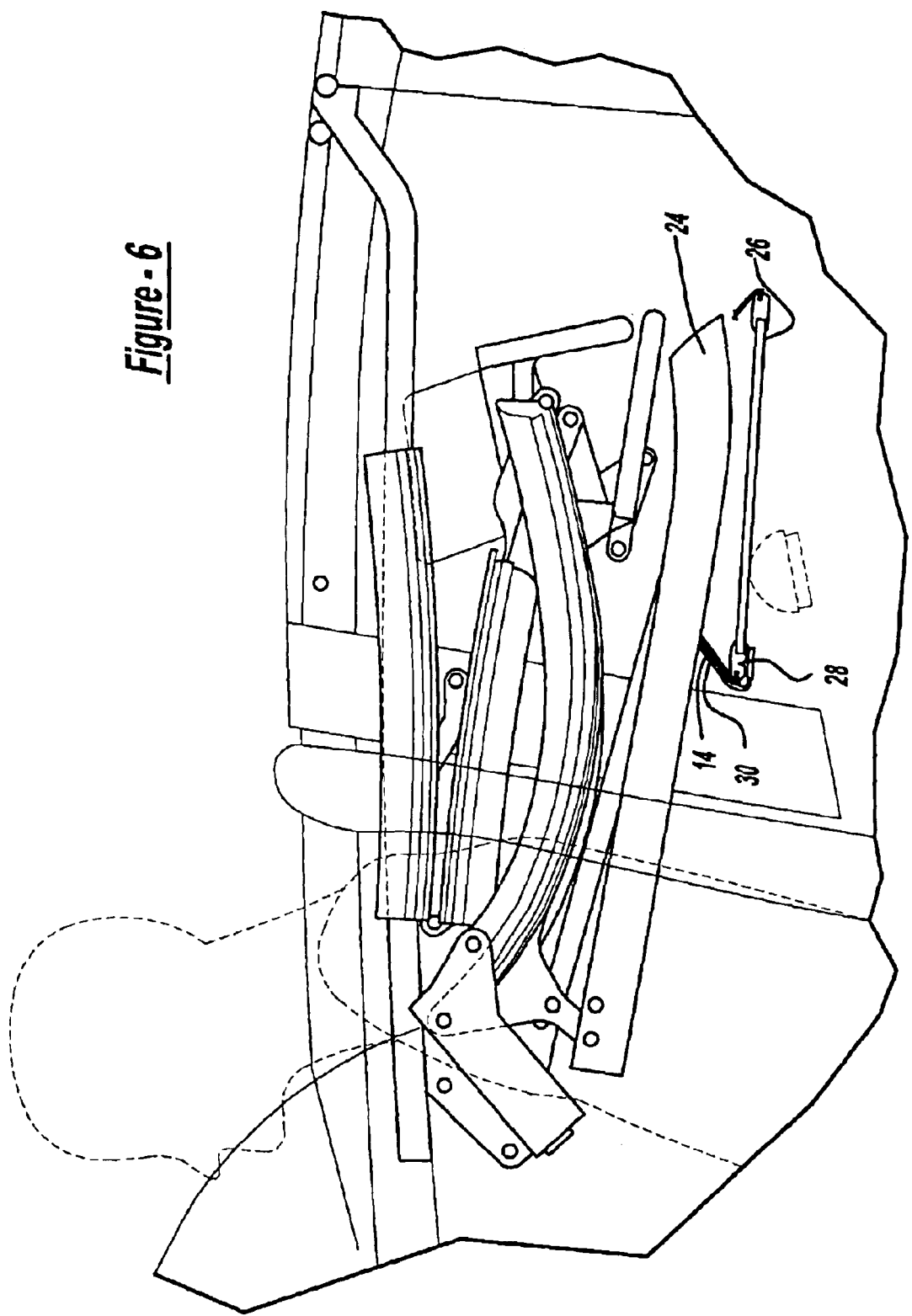

CONVERTIBLE BACKLITE CONTROL SYSTEM

BACKGROUND AND SUMMARY OF THE INVENTION

The present invention generally relates to convertible automotive vehicle roofs, and more particularly to a backlite control system in a convertible vehicle.

Soft-top convertible roofs for use in automotive vehicles have commonly consisted of a fabric top supported by at least four roof bows and a glass back window, also known as a backlite. As the convertible roof is extended or retracted, the backlite tends to partially collapse into a portion of the vehicle's rear interior space due to its weight pulling the loose fabric top. This can intrude into the rear of the passenger compartment thereby undesirably interfering with passengers, seat backs or other objects.

To overcome this concern, control links have occasionally been employed in convertible roof systems to control the movement of the backlite during advancement and retraction of the roof. An example of such a control link is disclosed in U.S. Pat. No. 5,788,316 entitled, "Folding Top for a Convertible" which issued to Rothe on Aug. 4, 1998. A device such as this, however, includes a complicated combination of articulating, heavy, metal links which attach to the side of the backlite. These links are not preferable because they are inflexible, cumbersome and may not provide for the desired accuracy of control of the backlite during extension and retraction of the roof assembly.

Another conventional method of controlling the position of the backlite during roof operation is to use ramps attached to the vehicle's rear seatbacks. As the roof is extended or retracted, the backlite is guided along these ramps into its desired position. However this method for controlling the backlite is not desirable as the repetitive movement of the backlite along the ramps causes rubbing and wearing of the vehicle seat backs and a lack of positioning accuracy.

In accordance with the present invention, a backlite control system is provided for an automotive vehicle having a convertible roof. In another aspect of the present invention, a backlite control link uses a living hinge to aid in controlling the travel of the backlite during expansion and retraction of the convertible roof. A further aspect of the present invention employs a backlite control link directly connected to the number four roof bow of the convertible roof assembly. In still another aspect of the present invention, a backlite control link is polymeric.

The backlite control system of the present invention is advantageous over conventional devices because the present invention employs a living hinge and directly attaches the backlite to the roof bow. This is advantageous because the living hinge permits a smoother control of the backlite during operation of the roof. In addition, the control link of the present invention accurately controls the movement of the backlite so as to prevent the backlite from interfering with persons or objects located in the rear passenger area of the vehicle during movement of the roof. Another advantage of the control link of the present invention is that it is constructed of a relatively small and simple part made of polymeric material which is lighter in weight and much less complex than conventional metal linkages thereby improving vehicle fuel efficiency and piece cost. Additional advantages and features of the present invention will become apparent from the following description and appended claims, taken in conjunction with the accompanying drawings.

BRIEF DESCRIPTION OF THE DRAWINGS

FIG. 6 is a fragmentary side elevational view showing the preferred embodiment of the backlite control system of the present invention, with the roof disposed in a fully retracted position.

DETAILED DESCRIPTION OF THE PREFERRED EMBODIMENT

Figure 1:
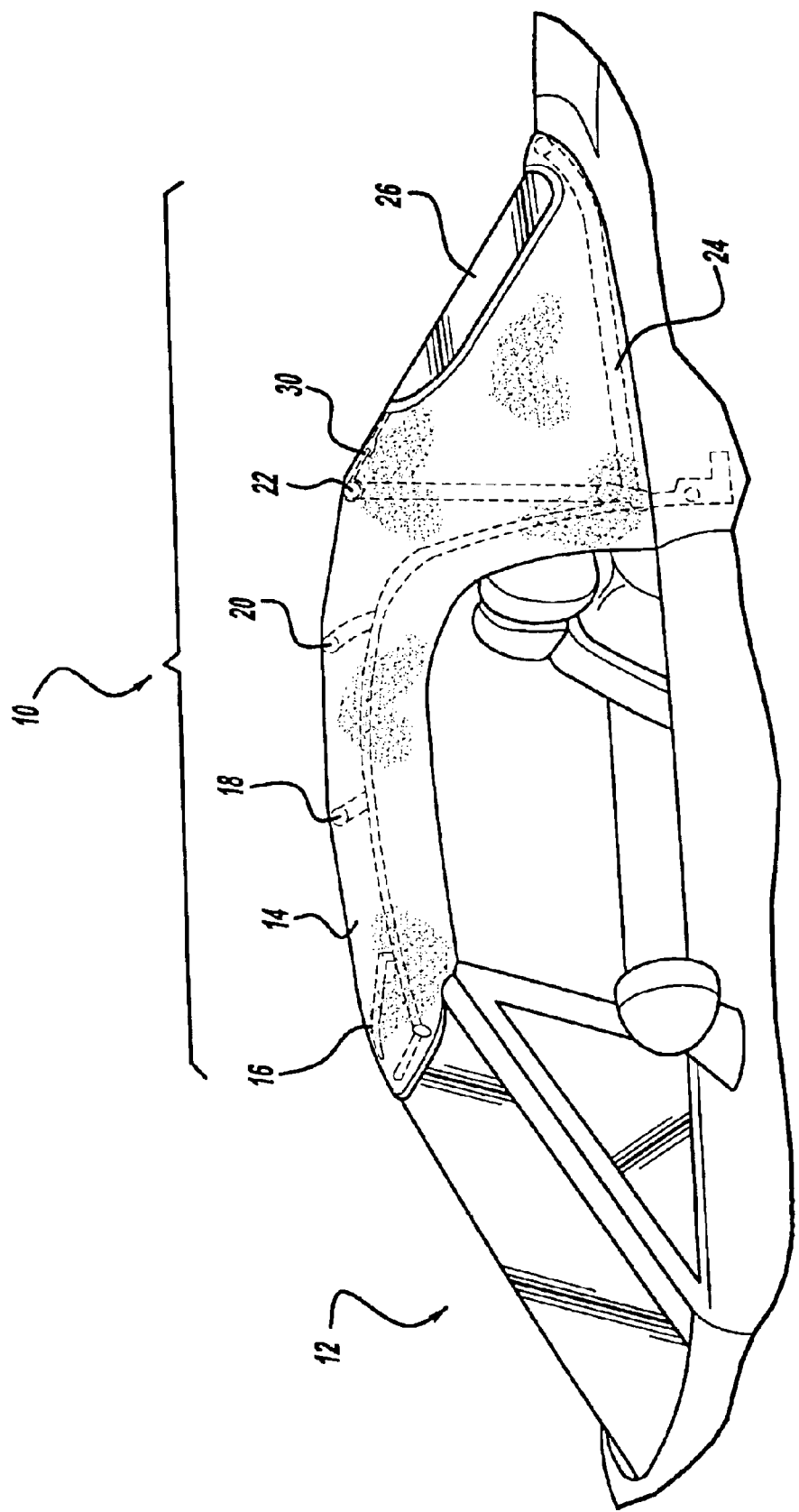
FIG. 1 is a side elevational view showing the preferred embodiment of a backlite control system of the present invention.
Figure 2:
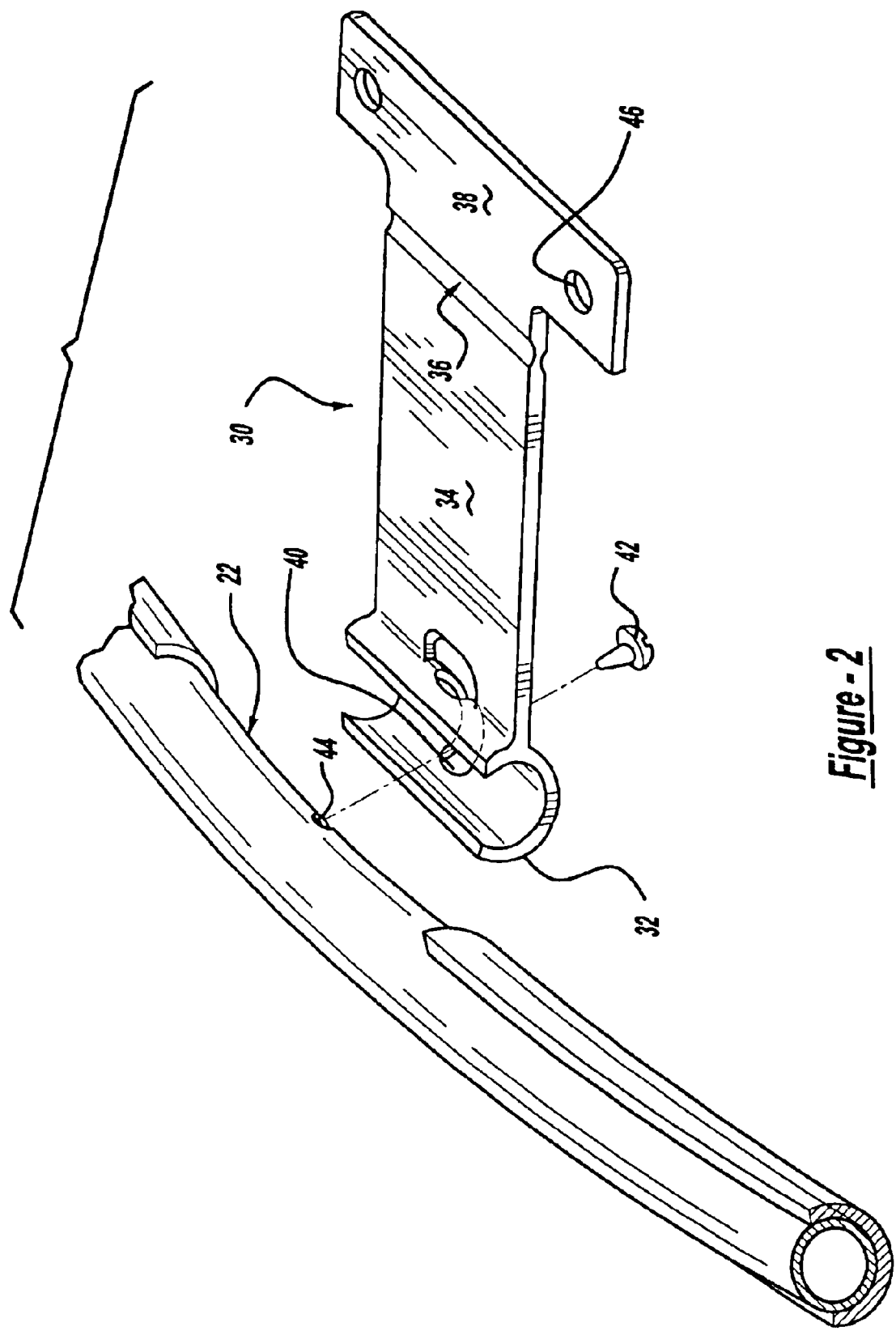
FIG. 2 is an exploded, perspective view showing the preferred embodiment of the backlite control system of the present invention.
Figure 3:
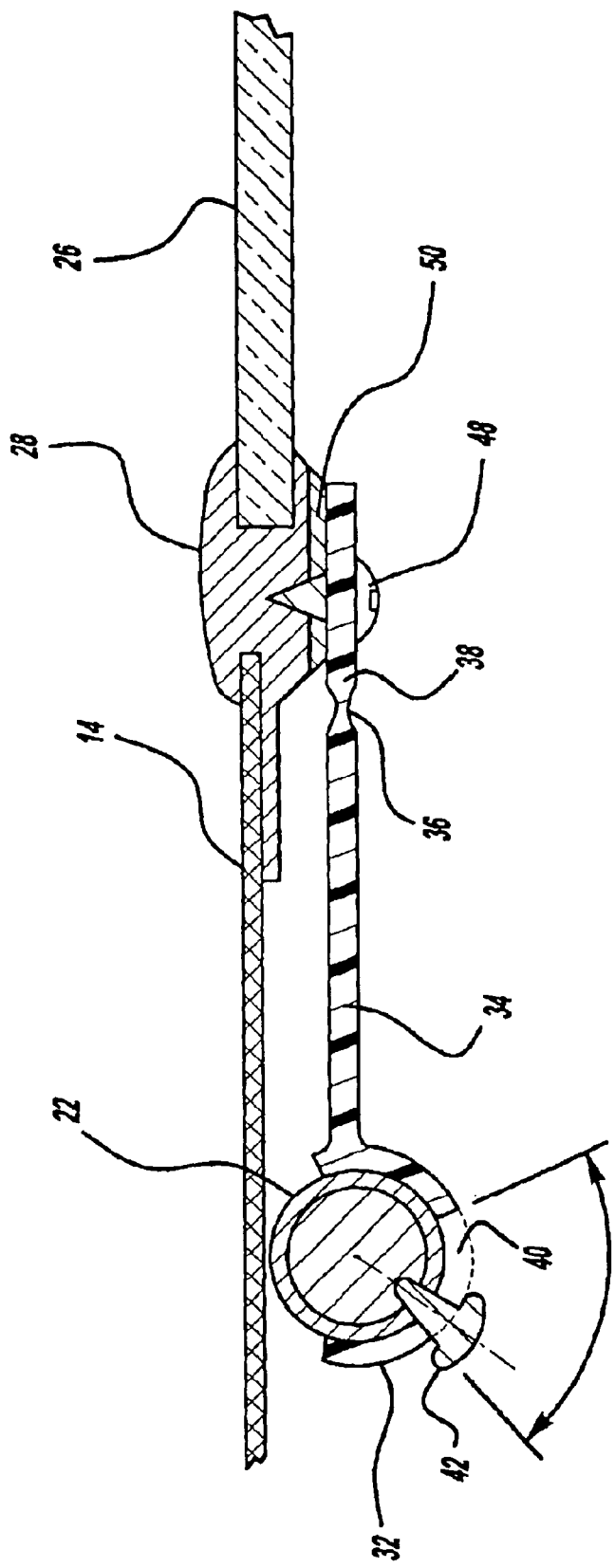
FIG. 3 is an enlarged cross-sectional view, taken within circle 3 of FIG. 4, showing the preferred embodiment of the backlite control system of the present invention.
Figure 4:
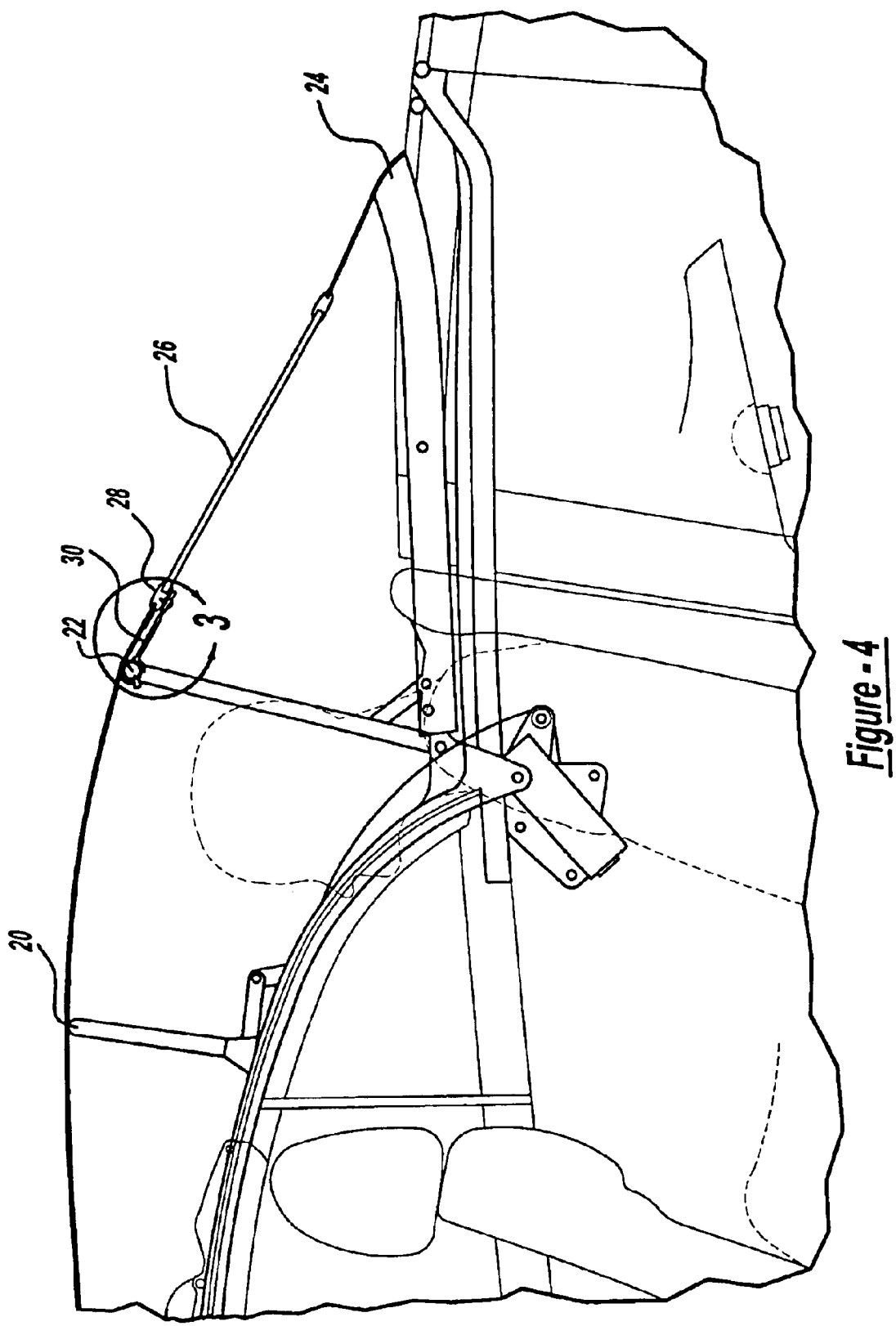
FIG. 4 is a fragmentary side elevational view showing the preferred embodiment of the backlite control system of the present invention, with the roof disposed in a fully extended position.

FIGS. 1 through 3 show the preferred embodiment of a backlite control system employed in a convertible roof assembly 10 of an automotive vehicle 12 of the present invention. Convertible roof assembly 10 includes a linkage assembly or top stack mechanism covered by a pliable fabric top covering 14. More specifically, the linkage assembly includes a number one roof bow 16, a number two roof bow 18, a number three roof bow 20, a number four roof bow 22 and a number five or rearmost roof bow 24. Four bow 22 is preferably a hollow and tubular metallic member although alternate extruded, molded or stamped shapes can be employed. Convertible roof assembly 10 is movable from a raised and extended position covering the vehicle's passenger compartment, as is shown in FIGS. 1 and 4, to a fully retracted and stowed position within a boot or storage area as shown in FIG. 6.

Convertible roof assembly 10 also has a back window assembly including a backlite or back window 26 and a backlite retainer 28. Backlite 26 is attached to a rear panel of roof covering 14 by way of backlite retainer 28 preferably by insert-molded encapsulation, but alternately by sewing, stapling, adhesive bonding, sonic welding or the like. Backlite 26 is preferably constructed as a three-dimensionally curved glass pane but may alternately be a pliable and transparent, polymeric sheet. Retainer 28 is preferably insert molded onto a peripheral edge of backlite 26 and attached to covering 14, and is made from a polyurethane polymer. Retainer 28 also acts as an elastic weather seal or gasket.

Figure 5:
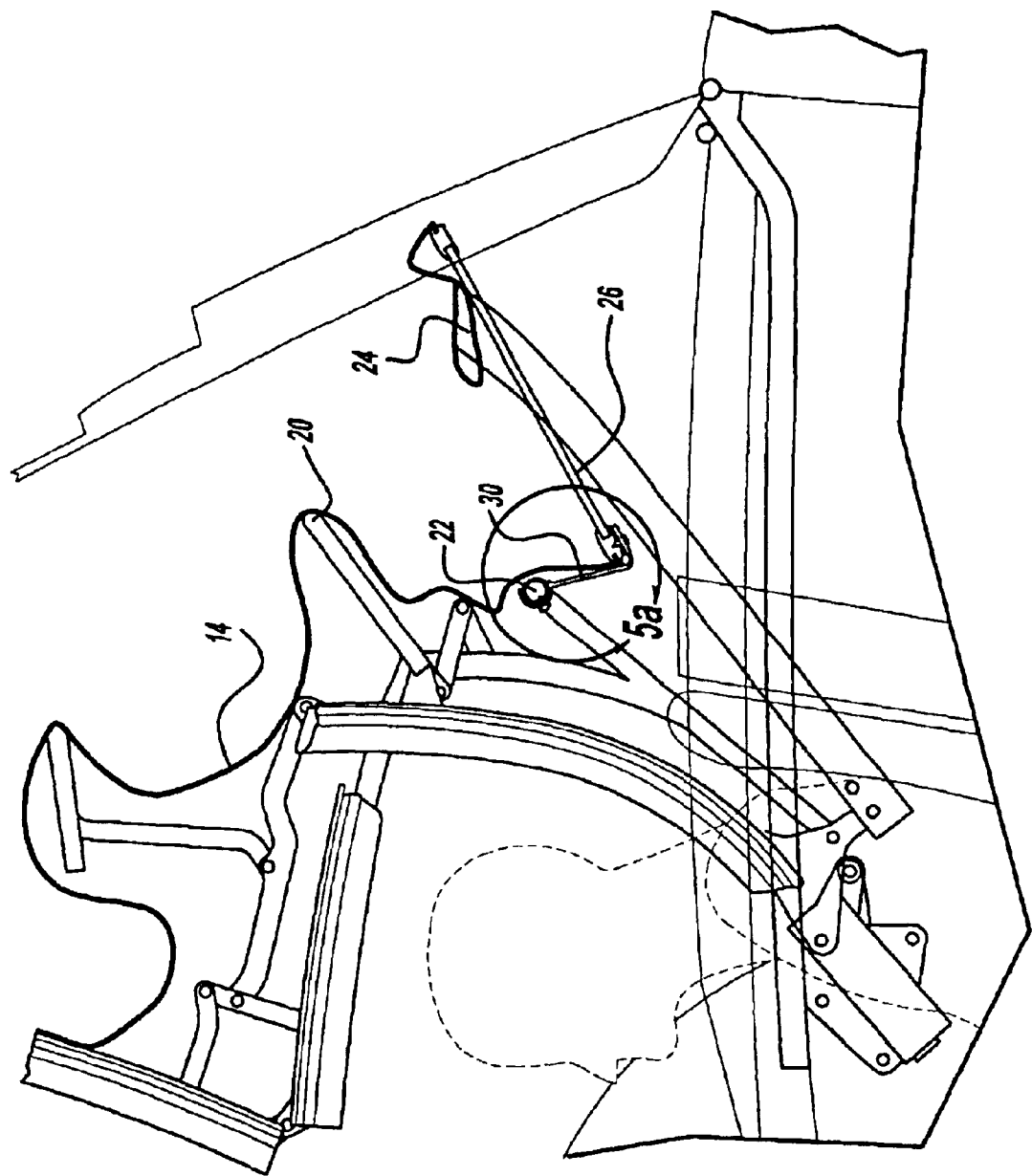
FIG. 5 is a fragmentary side elevational view showing the preferred embodiment of the backlite control system of the present invention, with the roof disposed in a partially retracted position.
Figure 5A:
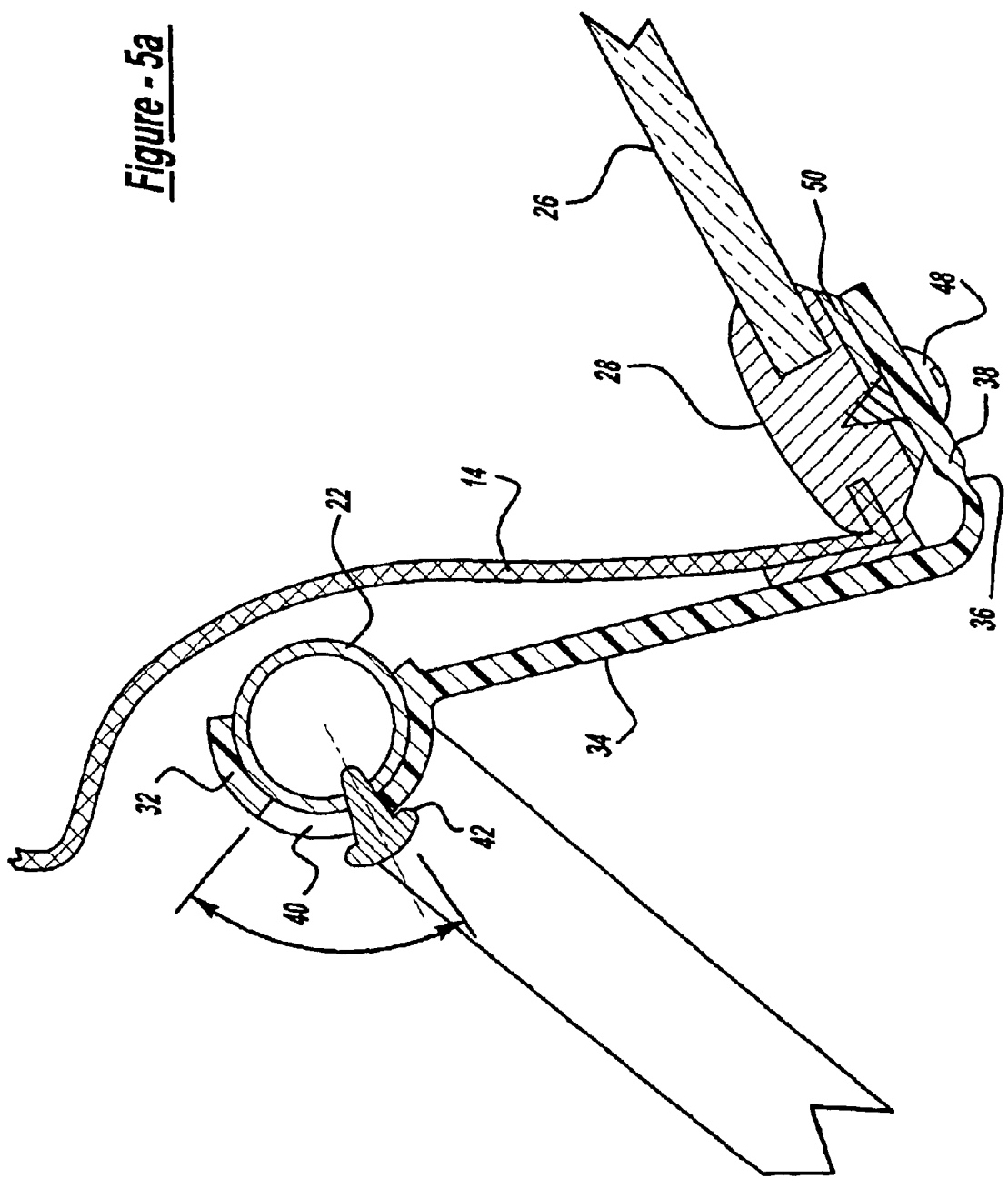
FIG. 5a is an enlarged cross-sectional view, taken within circle 5a of FIG. 5, showing the preferred embodiment of the backlite control system of the present invention.

Referring now to FIGS. 2, 3 and 5a, a backlite control link 30 is shown attached to top cover 14 and backlite retainer 28. Control link 30 is preferably injection molded from an engineering grade, polymeric material. Control link 30 is comprised of a half-annular end section 32, a central section 34, a living hinge section 36 and an attaching section 38. A fore-and-aft elongated slot 40 is located along the center of the half-annular end section 32. Control link 30 is rigidly fixed to top cover 14 by inserting four bow 22 into the half-annular end section 32 and then securing the control link 30 with a rivet or screw fastener 42 through slot 40 and into an aperture 44 in the four bow. Fastener 42 is allowed to slide within slot 40 as a lost motion pin or structure.

In a preferred embodiment of the present invention, attaching section 38 of control link 30 has a pair of apertures 46. Control link 30 is attached to backlite retainer 28 by inserting a mechanical fastener 48, such as a screw or rivet, through the aperture 46 for securing attaching section 38 to backlite retainer 28. In an alternative embodiment, attaching section 38 of control link 30 may be attached to backlite retainer 28 by way of optional adhesive bonding 50 and/or encapsulation within a PVC or polyurethane retainer 28, using the process disclosed in the following U.S. Pat. Nos.: 6,341,810 entitled "Covering Arrangement such as a Softtop for a Motor Vehicle" which issued to Hartmann et al. on Jan. 29, 2002; U.S. Pat. No. 5,822,932 entitled "Method for Making a Vehicle Window Panel Using a Melt-Processible Gasket Material" which issued to Agrawal on Oct. 20, 1998; and 5,807,515 entitled "Method for Making Vehicle Panel Assembly" which issued to Fisher et al. on Sep. 15, 1998; all of which are incorporated by reference herein.

Returning to the preferred embodiment, slot 40 in combination with living hinge 36, enables control link 30 to flexibly control and move backlite 26 during both retraction and extension of convertible roof assembly 10. The fore-and-aft size of slot 40 determines the degree of rotation of backlite 26 relative to the position of four bow 22. Specifically, the larger the slot, the greater the flexion of living hinge 36 which results in a greater degree of rotation of backlite 26, relative to the position of four bow 22. Conversely, the smaller the slot, the smaller the flexion of living hinge 36 which results in a smaller degree of rotation of backlite 26, relative to the position of four bow 22.

Control link 30 accurately controls the position of backlite 26, in a very direct and essentially one-piece manner, through its travel as the convertible roof assembly 10 cycles between an extended and raised position, and a fully retracted position, as shown in FIGS. 4 through 6. FIGS. 3 and 4 show convertible roof assembly 10 in a fully extended position. As the assembly retracts, as is illustrated in FIGS. 5 and 5a, living hinge 36 of control link 30 flexes about a generally cross-car and horizontal axis in relation to the movement of four bow 22, guiding backlite 26 away from the rear vehicle compartment towards its final retracted position. FIG. 6 shows convertible roof assembly 10 in its fully retracted position within the storage compartment of the vehicle. As shown, control link 30 has guided the retraction of backlite 26 so that, in its fully retracted position, backlite 26 is located below a horizontal plane defined by five bow 24. Furthermore, upon extension of convertible roof assembly 10, control link 30 keeps backlite 26 out of the rear passenger area of the vehicle as five bow 24 cycles up.

While the preferred embodiment of the convertible backlite control system has been disclosed, various alterations can be made which fall within the scope of the present invention. For example, the backlite retainer can be metallic, an injection molded polymer, a synthetic rubber gasket, or PVC. Furthermore, a differing number of roof bows can be employed such that the backlite control link may attach to a three bow or a five bow. Moreover, the disclosed control link can be coupled to the rear of a hard top front roof section and a backlite attached to a soft top rear roof section. The present invention can also apply to a side window in a convertible roof although some of the present advantages may not be fully realized. Additionally, an alternate lost motion coupling configuration of the backlite control link to roof bow may be provided through use of a slot in the roof bow and fixed pin in the control link, camming and follower surfaces, concentric hub and sleeve constructions, an added multi-pivoting link and the like, although the presently disclosed simplicity may be sacrificed. While various materials and angles have been disclosed, others may of course be used. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An automotive vehicle, convertible roof system comprising:
    a roof bow movable from a raised position to a retracted position;
    a window assembly movable from a raised position to a retracted position; and
    a control member operably attaching the window assembly to the roof bow, the control member including a living hinge section and a section being substantially more rigid than the living hinge, the sections of the control member being integral with each other.

2. The system of claim 1 wherein the window assembly further comprises a back window.

3. The system of claim 2 wherein the control member positions the back window relative to the roof bow during retraction.

4. The system of claim 1 wherein the window assembly further comprises an elastic retaining member secured around a periphery of a window, the retaining member acting as a weather seal, and the control member being attached to the retaining member.

5. The system of claim 4 further comprising a fabric roof cover externally covering and being retractable with the roof bow, and the roof cover being attached to the retaining member.

6. The system of claim 1 wherein the window assembly includes a three-dimensionally curved and rigid glass panel.

7. The system of claim 1 wherein the control member is polymeric.

8. The system of claim 1 wherein the roof bow is a number four roof bow.

9. The system of claim 1 wherein the control member upwardly extends toward the roof bow substantially above and forward from an upper peripheral edge of the window assembly when in the raised positions.

10. The system of claim 1 further comprising a lost-motion coupling acting to connect the control member to the roof bow.

11. An automotive vehicle, convertible roof system comprising:
    a retractable roof bow;
    a retractable window; and
    a control member coupling the window to the roof bow, the control member being polymeric and directly attaching to the roof bow substantially above and forward from an upper peripheral edge of the window.

12. The system of claim 11 further comprising a lost-motion coupling connecting the control member to the root bow.

13. The system of claim 12 wherein the lost-motion coupling includes an elongated slot and a structure riding in the slot.

14. The system of claim 12 wherein the lost-motion coupling assists in controlling the movement of the window relative to the roof bow during retraction.

15. The system of claim 11 wherein the control member includes a flexible living hinge.

16. The system of claim 11 wherein the roof bow is a number four roof bow.

17. The system of claim 11 wherein the window is a three-dimensionally curved back window.

18. A convertible roof comprising:

a set of retractable roof bows;

a fabric cover supported by the roof bows;

an assembly including a substantially rigid panel positioned along a substantially cross-car and substantially vertical plane when fully raised; and a control link attaching an upper periphery of the panel to a cross-car section of at least one of the roof bows when raised the control link including a hinge; and a lost-motion coupling connecting the control link to one of the roof bows.

19. The roof of claim 18 wherein the control link is substantially rigid along a substantially fore-and-aft and vertical lane but allows for flexure at a hinge portion of the control link.

20. The roof of claim 18 wherein the lost-motion coupling includes an elongated slot and a structure riding in the slot.

21. The roof of claim 18 wherein the lost-motion coupling assists in controlling the movement of the panel relative to at least one of the roof bows during retraction.

22. The roof of claim 18 wherein the panel is a window and the control link is polymeric.

23. The roof of claim 22 wherein the window is a rigid back window.

24. The roof of claim 18 wherein the assembly includes a gasket extending around the periphery of the panel.

25. The roof of claim 24 wherein an end of the control link is attached to the gasket.

26. The roof of claim 18 wherein a majority of the control link is polymeric and the hinge is a flexible narrowed thickness of the control link.

27. A back window control link comprising:

a semi-annular end section including an elongated slot;

a central section made at a polymeric material and including a reduced thickness living hinge; and a back window attaching section located on an opposite side or the living hinge from the semi-annular end section.

28. The link of claim 27 further comprising a metallic fastener extending through the back window attaching section which is polymeric.

29. A method of operating a convertible roof of an automotive vehicle having a roof bow, a control member, a back window and a fabric cover, the method comprising:

(a) controlling positioning of the back window with the control member which is directly connected to the roof bow;

(b) retracting the convertible roof;

(c) flexing a portion of the control member during step (b);

(d) loosening the fabric cover during step (b); and (e) limiting the movement of the back window relative to the roof bow during step (d).

30. A method of operating a convertible roof of an automotive vehicle having a roof bow, a control member, a back window and a fabric cover, the method comprising:

(a) retracting the convertible roof;

(b) flexing a portion of the control member during step (a);

(c) loosening the fabric cover during step (a);

(d) limiting the movement of the back window relative to the roof bow during step (c); and (e) rotating a section of the control member around a cross-car section of the roof bow.

31. The method of claim 30 wherein at least a majority of the control member is polymeric and the back window is three-dimensionally curved glass.

32. A method of operating a convertible roof of an automotive vehicle having a roof bow, a control member, a back window and a fabric roof cover, the method comprising:

(a) retracting the convertible roof;

(b) flexing a portion of the control member during step (a);

(c) loosening the fabric cover during step (a); and (d) limiting the movement of the back window relative to the roof bow during step (c); and (e) causing the control member to guide an upper portion of the back window in a substantially rigid manner in an elongated direction of the control member while flexing the control member substantially perpendicular to the elongated direction.

\* \* \* \* \*

UNITED STATES PATENT AND TRADEMARK OFFICE
CERTIFICATE OF CORRECTION

PATENT NO.   : 6,789,836 B2
DATED        : September 14, 2004
INVENTOR(S)  : Michael T. Willard It is certified that error appears in the above-identified patent and that said Letters Patent is hereby corrected as shown below:

Column 4
Line 60, "root" should be -- roof --.

Column 5,
Line 16, "raised" should be -- raised, --.
Line 45, "or" should be -- of --.

Column 6,
Line 33, after "fabric" delete "roof".

Signed and Sealed this

Twenty-ninth Day of March, 2005

JON W. DUDAS
*Director of the United States Patent and Trademark Office*